Sept. 14, 1954   R. S. REAVES   2,688,908
IMPLEMENT HITCH FOR TRACTORS
Filed Aug. 24, 1949
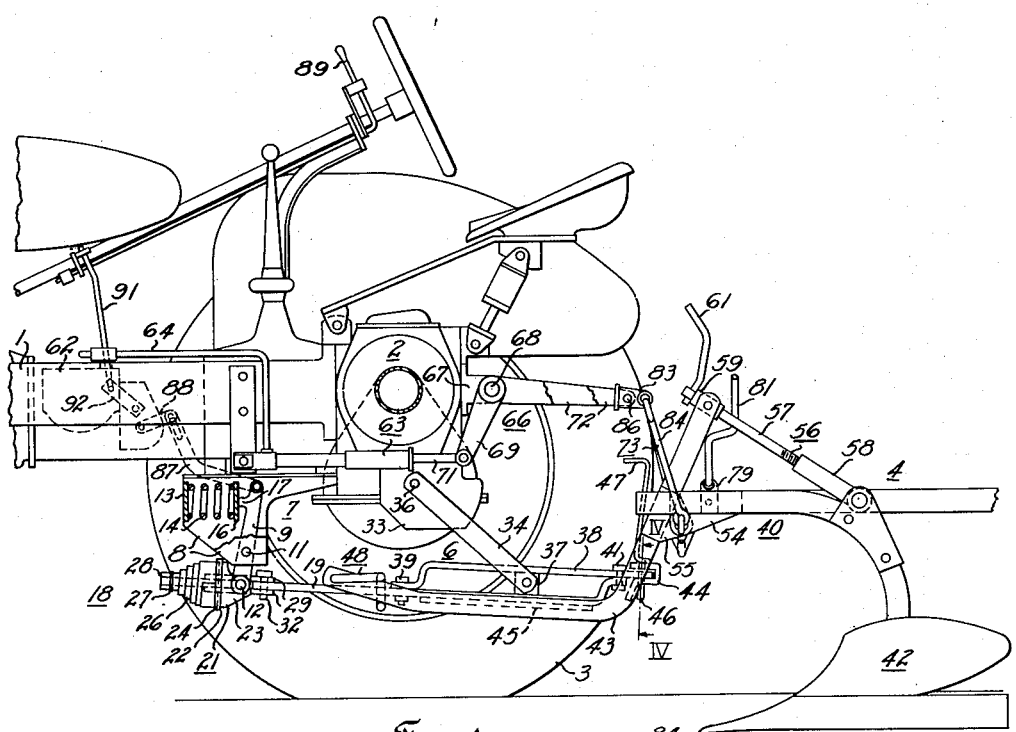
Fig. 1
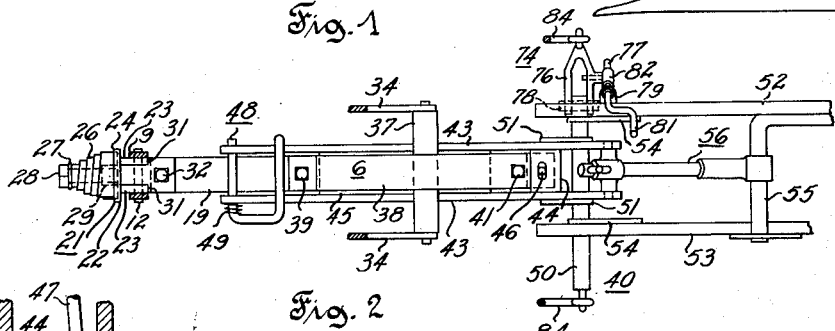
Fig. 2
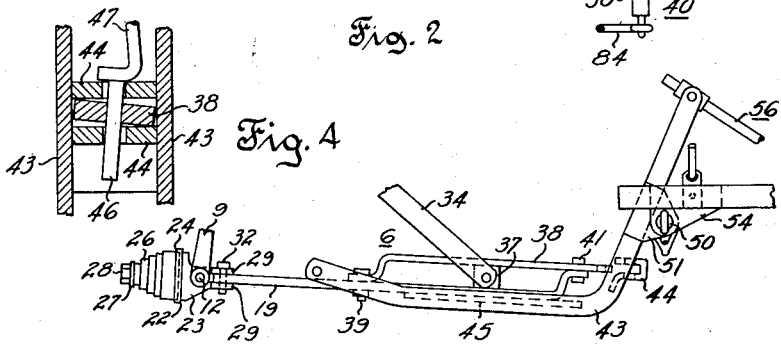
Fig. 4
Fig. 3
Inventor
Robert S. Reaves
by Louis V. Schiavo
Attorney Patented Sept. 14, 1954

2,688,908

UNITED STATES PATENT OFFICE 2,688,908

IMPLEMENT HITCH FOR TRACTORS

Robert S. Reaves, La Crosse, Wis., assignor to Allis-Chalmers Manufacturing Company, Milwaukee, Wis., a corporation of Delaware Application August 24, 1949, Serial No. 112,057

21 Claims. (Cl. 97—46.07)

1

The present invention relates to the connection of an agricultural implement or the like to a suitable propelling vehicle, hereinafter called a tractor, and is more particularly concerned with the provision of an improved quick hitch structure affording material advantages as to ease of implement attachment and/or adjustment.

In tractor attached implements, and more especially plows, it is generally desirable to make provision for selective lateral tilting of the plow in order to effect a suitable leveling adjustment, and while the prior art is replete with plows attached to the rear of a tractor through means affording this lateral tilting, none of these known constructions utilize the tractor drawbar as an element of a quick hitch structure enabling the drawbar and implement to be shifted as a unit both laterally and vertically and yet allowing a lateral tilting of the implement relative to the drawbar.

Accordingly, an object of the present invention is to utilize the drawbar of a tractor and the draft element of an implement to provide a new and improved quick hitch structure enabling the drawbar and implement to be bodily shifted as a unit both laterally and vertically relative to the tractor.

Another object of this invention is to provide a hitch structure of this type incorporating parts constructed and combined in a novel and improved manner to afford a relative angular displacement of the drawbar and implement about a longitudinal axis.

A further object of this invention is to provide a structure of the type specified in the two next preceding paragraphs rendered effective by a pair of longitudinally spaced quick attaching members to transmit a draft induced force and to limit the relative angular displacement.

The present invention also relates to tractors having a draft regulating mechanism including a control element pivotally supported for fore and aft swinging movement in response to variations in a draft induced force applied thereto through a drawbar having an end portion operatively attached to said element, and still another object of this invention is to utilize such a drawbar, the tongue or draft element of an implement, and vertically movable tractor carried supports to provide a quick hitch structure rendering the drawbar and implement bodily movable as a unit in a fore and aft direction in response to variations in the draft induced force and movable as a unit both vertically and laterally relative to the control element.

2

And a further object of this invention is to provide a quick hitch supporting structure of the type specified in the next preceding paragraph wherein the connections between the implement and the tractor carried supports afford a lateral tilting adjustment of the implement relative to the drawbar.

The construction and operation of apparatus incorporating the invention will become readily apparent as the disclosure progresses and points out additional objects and advantages considered of special importance. And, accordingly, the present invention may be considered as comprising the various features of construction and/or combination hereinafter more fully set forth in the detailed description and appended claims, reference being had to the accompanying drawings, in which:

Fig. 1 is a side elevation of the rear portion of a tractor with the near side wheel omitted in the interest of clarity;

Fig. 2 is a sectional plan view of the drawbar and the attached implement;

Fig. 3 is a side elevation of the construction shown in Fig. 2 with pins 46 and 48 removed and the drawbar and implement slightly drawn apart; and Fig. 4 is a partial view taken on line IV—IV of Fig. 1 with the coacting drawbar and implement tongue structure parts shown in the positions assumed following a lateral tilting of the tractor relative to the implement.

Referring particularly to Fig. 1, it will be seen that the tractor element of the combination comprises a frame structure 1 mounting a rear axle housing 2 supported on widely spaced ground engaging rear traction wheels 3 mounted at opposite ends thereof in a conventional manner, and a drawbar structure, whereas the attachment element of the combination comprises an implement 4 hitched to the tractor, and more particularly to drawbar structure 6, details of the hitch being hereinafter more fully described.

The tractor is provided with a draft regulating apparatus affording a front support for the drawbar structure. This support 7 includes a pair of laterally spaced plate members 8 fixed in depending relation to the under portion of the tractor, as by welding, immediately forward of and below axle housing 2. A lever 9 is positioned between and carried by plate members 8 for swinging movement relative thereto about a transverse axis by means of a pivot pin 11 which extends through aligned openings in opposed lower portions of plate members 8 and through an intermediate portion of lever 9. The lower portion of this lever is bifurcated and has aligned transverse openings therethrough affording bearing means supporting opposite end portions of a pivot pin or draft control element 12 which affords means for connecting a drawbar or other draft inducing structure to the lower end of lever 9. Movement of lever 9 in response to a draft induced force applied to the lower portion thereof is resisted by spring means comprising a fixed seat 13 carried by upper forward portions of plate members 8 in transverse relation thereto, a compression spring 14 having one end abutting seat 13, and a plate member 16 fixed to the opposite end of the spring and engaging a forward projection 17 on an upper portion of lever 9.

Drawbar structure 6 comprises shock spring assembly 18 and a drawbar member 19 connected thereto. The assembly includes a generally U-shaped element 21 having a flat circular main body or bight 22 and a pair of arms 23. This main body has an opening therein disposed on the central axis thereof and a raised rim 24. The arms are formed integrally with the main body and are disposed to extend outwardly from spaced portions thereof in opposed relation to one another. In addition, they are provided with openings in opposed portions thereof by means of which they engage pivot pin 12 for swinging movement of U-shaped element 21 thereabout, said arms being thereby disposed in close adjacent inner relation to the bifurcations of lever 9 and said main body being thereby disposed to face forward. The base of a compression spring 26, which is coiled to fold into itself, is disposed within rim 24 and seated against main body 22. The apex of this spring engages a washer 27, which is disposed under the head of a bolt 28 extending rearwardly in coaxial relation to said spring. The rearward extremity of bolt 28 is disposed in forward spaced relation to pivot pin 12, and a pair of similar bar members 29 are rigidly secured thereto, being thereby disposed in parallel vertically spaced relation to one another. These members extend rearwardly for free sliding movement through the opening in main body 22 and between arms 23. They also extend, respectively, over and under pivot pin 12 for sliding movement relative thereto and for swinging movement thereabout with U-shaped element 21. The rear end portions of these bar members are provided with shoulders 31, which normally abut arms 23. In addition, the rear end portions of bar members 29 receive a forward end portion of drawbar member 19 therebetween, and a pivot bolt 32 engages vertically aligned openings in these bar members for swinging movement of drawbar member 19 about a vertical axis.

Means for guiding or restricting the swinging movement of the drawbar structure is provided and comprises a pair of plate members 33 (of which only the near one is shown) fixed to the under portion of rear axle housing 2 in depending relation thereto and in laterally spaced and generally parallel relation with respect to each other. A pair of similar strap members 34 have upper ends pivotally mounted on coaxially aligned pins 36 (of which only one is shown) carried by plate members 33 and are thereby disposed to extend rearwardly and downwardly in transverse alignment along the laterally outer sides of said plate members. Opposite end portions of a guide bar 37 are secured in a suitable manner to opposed lower end portions of these strap members, thereby providing a bail structure swingable about the transverse pivot axis afforded by pins 36. A guide strap 38 has a downwardly offset forward end portion secured to an intermediate top side portion of drawbar member 19, as by bolt 39, and drawbar member 19 has an upwardly offset rear end portion secured to an intermediate bottom side portion of guide strap 38, as by bolt 41. Consequently, the main portion of guide strap 38 is disposed in overlying vertically spaced parallel relation to the underlying portion of drawbar member 19 with the rear end portion thereof extending beyond drawbar member 19 for connection with implement 4. Thus it will be seen that strap 38 is rigidly secured to drawbar member 19 and in effect forms a part thereof. Guide bar 37 extends through the opening between strap 38 and drawbar member 19 for sliding movement of the bail structure relative to the drawbar structure 6 as the bail is swung vertically about its pivot axis.

Implement 4 comprises a pair of conventional moldboard plows 42 (of which only the near one is shown) carried by an elongated implement frame structure 40 connected with a suitable draft element, hereinafter referred to as a tongue structure. This tongue structure comprises a pair of similar elongated bar members 43 disposed in transversely spaced, vertically parallel relation on opposite sides of drawbar member 19. Opposed intermediate portions of bar members 43 are disposed parallel to drawbar member 19 and extend beneath guide bar 37 for free movement of the latter in the opening between guide strap 38 and drawbar member 19. Opposed forward end portions of bar members 43 turn slightly upward from the intermediate portions thereof, extending partially above drawbar member 19. Opposed rear end portions of bar members 43 turn sharply upward from the intermediate portions thereof. Spacers 44 and 45, hereinafter also referred to as plate members, are rigidly secured, as by welding, between the rear upturned and intermediate portions, respectively, of bar members 43. Plate member 44 is formed and positioned so as to receive the rear end portion of guide strap 38 between opposed vertically spaced opposite end portions thereof, said vertical spacing being greater than the thickness of strap 38. The rear end portion of this strap is provided with a round opening which registers with slotted openings in said opposed end portions of plate member 44, the long axes of the slotted openings being disposed transversely of the tractor. And a vertically disposed pin 46 provided with a handle 47 is disposed in said openings, being easily and quickly insertable therein or removable therefrom. The top side of plate member 45 is positioned to engage the bottom of a portion of drawbar member 19 opposite guide strap 38. The forward ends of bar members 43 carry a pin 48, which comprises a straight section and a hooked section. The straight section slidably engages openings in opposed portions of bar members 43 and is thereby disposed in close spaced relation to the top side of drawbar member 19 in advance of guide strap 38, and the hooked section doubles back over both bar members 43 and terminates in a portion which hooks around the associated bar member 43, being secured thereagainst by a compression spring 49 mounted on the straight section and reacting against the hooked section and against the other one of bar members 43. And an elongated lift bar 50 is rigidly secured to frame members 43 through a pair of similar plate members 51 and is thereby disposed in rearward adjacent relation to these bar members, with opposite end portions thereof extending laterally beyond them.

The elongated implement frame structure 40 comprises elongated frame members 52 and 53 having forward end portions mounted on the opposite end portions of lift bar 50 through a pair of similar plate members 54. These frame members extend rearwardly from the lift bar and are rigidly secured together in transversely spaced relation to one another by a brace member 55 for vertical swinging movement in unison about lift bar 50, the rear end portions of the frame members turning downward for mounting moldboard plows 42. The tongue structure and the implement frame are also connected together by means of a beaming device 56 comprising a member 57 having a threaded end engaging an anchor element 58 suitably mounted on brace member 55 for swinging movement about a transverse axis and having its other end suitably journaled in a trunnion 59 mounted between opposed portions of bar members 43 for swinging movement about a transverse horizontal axis. Member 57 is provided with a handle 61 for turning the member to adjust the threaded end thereof in anchor element 58. Thus it will be seen that the beaming device bracingly adjustably connects the tongue structure with the implement frame.

The tractor is provided with a hydraulic implement lift means comprising a pump 62 deriving power from the tractor engine (not shown), a ram 63 receiving fluid from the pump through a conduit 64, and a ram actuated lift mechanism 66. The lift mechanism includes a pair of plate members 67 (of which only the near one is shown) fixed to and extending rearwardly from laterally spaced portions of rear axle housing 2 in generally parallel spaced relation, a rock shaft 68 rotatably mounted in transversely aligned bearing means (not shown) carried by plate members 67 and suitably preventing a lateral displacement of this shaft, an actuating arm 69 terminally rigidly connected to shaft 68 and extending forwardly downward therefrom with its free end pivotally connected to the rearwardly extending piston rod 71 of ram 63, and a pair of similar lift elements or arms 72 terminally rigidly connected to longitudinally spaced portions of shaft 68 and extending rearwardly therefrom in transverse alignment. The free ends of arms 72 are connected to the upper end portions of a pair of similar lift hangers 73, which extend downward for connection of their lower ends to the opposite end portions of underlying lift bar 50. The connection of the lift member 73 on the right hand side of the tractor, as viewed by the operator sitting at his station on the tractor, with lift bar 50 is made through a winging device 74, in effect forming a part of the lift hanger on this side of the tractor. This winging device comprises a wing arm casting 76 and a crank member 77. Casting 76 includes two arms having inner end portions which straddle the end of the lift bar and engage opposite end portions of a pin 78 rigidly carried by the lift bar, this casting being mounted on said pin for swinging movement about a horizontal axis. The outer end portions of the arms converge and have a rod receiving opening formed therein. The crank member includes an L-shaped bracket 79 having one leg rigidly secured to frame member 52 and the other extending outwardly to receive therethrough an intermediate portion of a handle 81. This handle is arranged to turn freely in said leg, but is fixed vertically relative thereto. The lower end of the handle is threaded into a trunnion 82, which is pivotally carried by an intermediate portion of the wing arm casting for swinging movement about a horizontal axis.

Each hanger 73 includes a coupling 83 and a rod 84. The coupling is hollow and fits loosely over the free end of the associated lift arm 72 in extension forming relation thereto. Registering openings in coupling 83 and in lift arm 72 receive a horizontally disposed pin 86, which is quickly and easily insertable therein or removable therefrom. The rod has a pair of eyes formed at opposite ends thereof which loosely engage, respectively, a rod receiving opening in a rear portion of coupling 83 and, on the left hand side of the tractor, a similar opening in the end of lift bar 50, and, on the right hand side of the tractor, the rod receiving opening in the wing arm casting.

Fig. 1 shows implement 4 in working position. In order to overcome the resistance of the ground to advancement of the plow bodies therethrough a draft force is applied to said bodies by the tractor through the draft control element or pin 12, the drawbar structure, the draft element and the frame structure carrying the plow bodies. Pivot pin 12 swings fore and aft with the lower portion of lever 9, its position being determined by the magnitude of the draft force and the resistance offered by the compressive force of spring 14 acting on the upper end of lever 9. And it will be noted that the movement of this lever is transmitted to suitable control mechanism enclosed in pump housing 62 by means of a link 87 having a pivotal connection with the upper end of the lever 9 and a lost motion (pin and slot) connection with a control arm 88 exterior to the pump housing. Also, a manually operated lever 89 within reach of an operator seated at his station on the tractor is connected to the mechanism controlling pump 62 through a link 91 and a lever 92 exterior to the rear side of the pump housing. And in general, it should be understood that the action of the pump is controlled by the movements of lever 9 affected by variations in draft force, and that manually actuated lever 89 affords a superimposed or dominating control operative to determine the working depth of the plow and to selectively lift, hold and lower the plows, as desired. In this connection, an operative coaction between control arm 88 and lever 92 may be established in any suitable manner, for example, as disclosed in U. S. Patent 2,118,180, issued May 24, 1938, to H. G. Ferguson, particular reference being had to Fig. 1.

Pivot pin 12 affords means for connecting the forward end of drawbar structure 6 to the lower end of lever 9. And it will be observed that fore and aft swinging movement of lever 9 about pivot pin 11, which is caused by variations in a draft induced force acting on the lower end of the lever, and which is resisted by the force of spring 14 acting on the upper end of the lever, affords corresponding fore and aft movement of pivot pin 12 and drawbar structure 6. In addition, drawbar structure 6 may move fore and aft relative to pivot pin 12 by reason of the fact that when the plow bodies encounter an obstruction which offers unusual resistance spring 26 is compressed between element 21 and the head of bolt 28, the bolt moving rearwardly to take up the space between its rear extremity and pivot pin 12, bar members 29 slidably passing, respectively, over and under pivot pin 12 for movement with bolt 28. In this connection, it will be observed that the shoulders 31 formed on bar members 29 normally abut arms 23 for limiting the forward movement of bolt 28 relative to pivot pin 12.

When a relative lateral tilting adjustment of the tractor and the implement is found desirable, as when it is desired to level the plow bodies relative to the ground surface while the tractor is at an angle relative thereto, handle 81 of the winging device 74 is turned in the proper direction and as a result the entire implement is tilted relative to the tractor until the plow bodies are level with the ground surface, the position of bars 43 and the opposed opposite end portions of plate 44 relative to the rear end portion of strap 38 and pin 46, after this adjustment, being clearly shown in Fig. 4. The transverse spacing between bar members 43, the vertical spacing between plate member 45 and pin 48, and the vertical spacing between the opposed opposite end portions of plate member 44 is made no greater than is necessary to provide for this tilting movement. It will be noted that pin 46 fits into a round opening in strap 38 and therefore does not tilt with the attachment. However, the elongated openings in the opposed oppostie end portions of plate member 44 do afford this tilting movement.

The forces acting on implement 4 may be such as to tend to cause horizontal angular movement of the implement relative to the drawbar structure. In this event, the forward end portion of one of the bar members 43 and the rear end portion of the other bar member 43 bear, respectively, against drawbar member 19 and guide strap 38 to prevent the movement. The forces may also be such as to tend to cause vertical angular movement of the implement relative to the drawbar structure. In the event that the tendency is for clockwise movement, as viewed in Fig. 1, plate members 44 and 45 act to prevent it. In the event that the tendency is for counterclockwise movement, pin 48 and plate members 44 and 45 act to prevent it. In addition, pin 46 acts to prevent axial displacement of the implement relative to the drawbar structure. Thus it will be seen that the implement and the drawbar structure are generally rigidly connected together for movement as a unit.

It will be observed that while the implement and drawbar structure are movable fore and aft relative to the tractor and swingable laterally about pivot block 32, these movements are relative to lift arms 72. Consequently, provision must be made for swinging movement of rods 84, and this is effected by the loose connections at both ends of these rods. Also, it will be observed that the implement and drawbar structure may swing laterally only between strap members 34, which act as stop means.

In order to disengage the tractor and the implement, it is only necessary to remove pins 46, 48 and 86. Then the tractor may be driven away from the implement. It will be observed that pin 48 may be removed by manually sliding the pin laterally against the force of compression spring 49 to disengage the hooked section thereof from the associated bar 43, swinging the hooked section upward to clear bars 43 and then sliding the pin in the oppostie direction until fully removed. In order to hitch the implement to the tractor the drawbar structure is supported in any suitable manner from the tractor and thereby disposed in a generally horizontal position. The tractor is then backed into the implement which is supported on the ground, the bar member 19 being guided into position by bar members 43 and plate member 45 so that the rear end portion of guide strap 38 engages plate member 44. In this connection it will be noted that the rear wall of member 44 limits the rearward movement of drawbar 19 relative to the tongue structure. Moreover, it will be apparent that member 44 coacts with members 43 to provide a forwardly opening compartment adapted to slidably receive the rear end of drawbar 19. Pins 46 is now inserted. Then lift arms 72 are vertically adjusted so that one of them is in position to receive the associated coupling 83. The winging device 74 is now utilized to bring the other lift arm into position for receiving the other coupling 83, and then pins 86 are inserted. Finally, lift arms 72 are vertically adjusted to bring the forward end portion of bar members 43 into proper relation to drawbar member 19 so that pin 48 may be inserted.

It should now be obvious that a tractor has been provided with a hitch including a drawbar positioned in underslung relation to the tractor and connected to a control element carried by the tractor for fore and aft swinging movement in response to variations in the draft force. And it will be seen that an implement is connected to the drawbar in a manner affording movement of the drawbar and implement as a unit upon insertion of a pair of quick engaging elements or pins. In addition, the hitch is designed and constructed for relative movement between the drawbar and implement sufficient to provide for lateral tilting or winging of the implement relative to the drawbar, the hitch becoming effective to limit this relative movement upon insertion of one of the quick engaging pins and effective to transmit the draft force upon insertion of the other. And it will be seen that the drawbar-implement combination is supported from the tractor in a manner affording bodily fore and aft movement thereof, as well as both lateral and vertical swinging movement. In other words it should now be apparent that a quick hitch structure is provided wherein one element thereof, namely the drawbar, serves in a dual capacity, that is as a draft structure for a trailing implement, or as a support for a rear attached tractor mounted implement, and that this drawbar affords automatic draft regulation for both types of implements. Furthermore, it will be apparent that this quick hitch structure may be considered as including attaching means having longitudinally spaced elements, namely pins 46 and 48, detachably uniting the overlapping portions of said drawbar and tongue. This provides a compound structure swingable bodily as a unit.

It should be obvious that although the apparatus herein disclosed as embodying the invention has particular utility in the tilling of soil, certain features are of more general application and that, therefore, it is not intended to limit the invention to the exact construction and combinations herein shown and described for purposes of illustration as various modifications within the scope of the appended claims may occur to persons skilled in the art.

It is claimed and desired to secure by Letters Patent:

1. In combination with a tractor having a vertically swingable lift element and having a longitudinally extending drawbar disposed beneath said lift element, said drawbar being supported for vertical and lateral swinging movement relative to a front end support and presenting a rear end portion adapted for connection with the tongue structure of a trailing implement, an implement presenting a rigid tongue structure having spaced generally parallel fixed portions engaging opposite side portions of said drawbar in longitudinally overlapping relation thereto, attaching means detachably uniting longitudinally spaced portions of said drawbar and tongue structure so as to provide a compound drawbar and tongue structure movable bodily as a unit both laterally and vertically relative to said front end support, and vertically adjustable hanger means uniting said lift element and implement, said overlappingly engaged portions of the drawbar and tongue structure and said attaching means including parts coacting to afford a predetermined lateral tilting of said implement and tongue structure relative to said drawbar in response to a vertical adjustment of said hanger means.

2. In combination with a tractor having a pair of laterally spaced vertically swingable lift elements and having a longitudinally extending drawbar disposed beneath and between said lift elements, said drawbar being supported for vertical and lateral swinging movement relative to a front end support and presenting a rear end portion adapted for connection with the tongue structure of a trailing implement, an implement presenting a rigid tongue structure having spaced generally parallel fixed portions engaging opposite side portions of said drawbar in longitudinally overlapping relation thereto, attaching means detachably uniting longitudinally spaced portions of said drawbar and tongue structure so as to provide a compound drawbar and tongue structure movable bodily as a unit both laterally and vertically relative to said front end support, and readily attachable vertically adjustable hanger means uniting said lift elements with correspondingly spaced portions of said implement, said overlappingly engaged portions of the drawbar and tongue structure and said attaching means including parts coacting to afford a predetermined lateral tilting of said implement and tongue structure relative to said drawbar in response to a vertical adjustment of said hanger means.

3. In combination with a tractor having a longitudinally extending drawbar supported for vertical and lateral swinging movement relative to a front end support and presenting a vertically offset rear end portion adapted for connection with the tongue structure of a trailing implement, an implement presenting an elongated rigid tongue structure having a vertically offset rear end portion presenting vertically spaced parts defining an opening adapted to receive said offset rear end portion of the drawbar, said tongue structure overlappingly engaging said drawbar with said offset rear end portion of the latter disposed between said vertically spaced parts, and attaching means detachably uniting a front end portion and said rear end portion of the tongue structure to an intermediate portion and said rear end portion, respectively, of the drawbar so as to provide a compound drawbar and tongue structure movable bodily as a unit both laterally and vertically relative to said front end support.

4. In combination with a tractor having a longitudinally extending drawbar supported for vertical and lateral swinging movement relative to a front end support and presenting a vertically offset rear end portion adapted for connection with the tongue structure of a trailing implement, an implement presenting an elongated rigid tongue structure including a fixed pair of transversely spaced elongated bar members disposed on opposite sides of said drawbar and each having a front and rear end portion vertically offset in the same direction, said rear end portions of the bar members presenting vertically spaced parts defining an opening adapted to receive said offset rear end portion of the drawbar, said tongue structure overlappingly engaging said drawbar with said offset rear end portion of the latter disposed between said vertically spaced parts, and attaching means detachably uniting said front and rear end portions of the elongated bar members to an intermediate and said rear end portion, respectively, of said drawbar so as to provide a compound drawbar and tongue structure movable bodily as a unit both laterally and vertically relative to said front end support.

5. In combination with a tractor having a longitudinally extending drawbar supported for vertical and lateral swinging movement relative to a front end support and presenting a vertically offset rear end portion adapted for connection with the tongue structure of a trailing implement, an implement presenting an elongated rigid tongue structure including a fixed pair of transversely spaced elongated bar members disposed on opposite sides of said drawbar and each having a front and rear end portion vertically offset from an intermediate portion and in the same direction, vertically spaced parts presented by said rear end portions of the bar members and defining an opening adapted to receive said offset rear end portion of the drawbar, a rigid part secured between said intermediate portions of the elongated bar members, and attaching means comprising a part detachably secured to said front end portions of the elongated bar members in vertically spaced relation to said rigid part, said elongated bar members overlappingly engaging said drawbar with the offset rear end portion of the latter disposed between said vertically spaced parts presented by said rear end portions of the elongated bar members and with an intermediate portion of said drawbar disposed between said attaching means and rigid part, and said attaching means also comprising a part detachably uniting said offset rear end portion of the drawbar and said vertically spaced parts presented by said rear end portions of the elongated bar members.

6. In combination with a tractor having a control element supported for fore and aft movement in response to variations in a draft induced force applied thereto, a lift element vertically swingable in response to movement of said control element, and a longitudinally extending drawbar disposed beneath said lift element, said drawbar being connected to said control element for vertical swinging movement relative thereto and for fore and aft movement therewith and presenting a rear end portion adapted for connection with the tongue structure of a trailing implement, an implement presenting a rigid tongue structure having spaced generally parallel fixed portions engaging opposite side portions of said drawbar in longitudinally overlapping relation thereto, attaching means detachably uniting longitudinally spaced portions of said drawbar and tongue structure so as to provide a compound drawbar and tongue structure movable bodily as a unit relative to said control element, and vertically adjustable hanger means uniting said lift element and implement for fore and aft movement and for vertical swinging movement of said drawbar and implement in response to actuation of said control and lift elements, said overlappingly engaged portions of the drawbar and tongue structure and said attaching means including parts coacting to afford a predetermined lateral tilting of said implement and tongue structure relative to said drawbar in response to a vertical adjustment of said hanger means.

7. In combination with a tractor having a vertically swingable lift element and having a longitudinally extending drawbar disposed beneath said lift element, said drawbar being yieldably supported for fore and aft movement and for vertical swinging movement relative to a front end support and presenting a rear end portion adapted for connection with the tongue structure of a trailing implement, an implement presenting a rigid tongue structure having spaced generally parallel fixed portions engaging opposite side portions of said drawbar in longitudinally overlapping relation thereto, attaching means detachably uniting longitudinally spaced and overlapping portions of said drawbar and tongue structure so as to provide a compound drawbar and tongue structure movable bodily as a unit vertically relative to said front end support, and vertically adjustable hanger means uniting said lift element and impelement for vertical swinging movement of said drawbar and implement in response to actuation of said lift element and for fore and aft movement thereof relative to said front end support, said overlappingly engaged portions of the drawbar and tongue structure and said attaching means including parts coacting to afford a predetermined lateral tilting of said implement and tongue structure relative to said drawbar in response to a vertical adjustment of said hanger means.

8. In combination with a tractor having a control element supported for fore and aft movement in response to variations in a draft induced force applied thereto, a pair of laterally spaced lift elements vertically swingable in response to movement of said control element, and a longitudinally extending drawbar disposed beneath and between said lift element, said drawbar being connected to said control element for vertical and lateral swinging movement relative thereto and for fore and aft movement therewith and presenting a rear end portion adapted for connection with the tongue structure of a trailing implement, an implement presenting a rigid tongue structure having spaced generally parallel fixed portions engaging opposite side portions of said drawbar in longitudinally overlapping relation thereto, attaching means detachably uniting longitudinally spaced portions of said drawbar and tongue structure so as to provide a compound drawbar and tongue structure movable bodily as a unit relative to said control element, and readily attachable vertically adjustable hanger means uniting said lift elements with correspondingly spaced portions of said implement for fore and aft movement and for vertical swinging movement of said drawbar and implement in response to actuation of said control and lift elements, said overlappingly engaged portions of the drawbar and tongue structure and said attaching means including parts coacting to afford a predetermined lateral tilting of said implement and tongue structure relative to said drawbar in response to a vertical adjustment of said hanger means.

9. In combination, an implement presenting an elongated rigid tongue structure projecting therefrom, an elongated rigid drawbar member presenting a rear end portion disposed in extension forming relation to said tongue structure and presenting a front end portion adapted for connection with a propelling vehicle, said tongue structure including a fixed pair of transversely spaced elongated bar members disposed on opposite sides of said drawbar and each having a front and rear end portion vertically offset from an intermediate portion and in the same direction, vertically spaced parts presented by said rear end portions of the bar members and defining and opening adapted to receive said offset rear end portion of the drawbar, a rigid part secured between said intermediate portions of the elongated bar members, and attaching means comprising a part detachably secured to said front end portions of the elongated bar members in vertically spaced relation to said rigid part, said elongated bar members overlappingly engaging said drawbar with the offset rear end portion of the latter disposed between said vertically spaced parts presented by said rear end portions of the elongated bar members and with an intermediate portion of said drawbar disposed between said attaching means and rigid part, and said attaching means also comprising a part detachably uniting said offset rear end portion of the drawbar and said vertically spaced parts presented by said rear end portions of the elongated bar members.

10. In combination with a tractor having a longitudinally extending drawbar supported for vertical and lateral swinging movement about vertical and horizontal axes carried by a front end support and disposed in proximate longitudinal relation thereto, said drawbar presenting a rear portion adapted for connection with the tongue of a trailing implement, an implement presenting a rigid tongue comprising forwardly projecting fixed members disposed in laterally spaced generally parallel relation, said members coacting with opposite sides of said drawbar rear portion in longitudinally overlapping relation thereto, attaching means including longitudinally spaced elements detachably uniting said overlapping portions of said drawbar and tongue so as to provide a compound structure movable bodily as a unit both laterally and vertically relative to said front end support, said overlapping portions of said compound structure and said attaching means including parts spaced sufficiently for coaction in a manner affording a predetermined lateral tilting of said tongue relative to said drawbar, and additional means adjustably coacting with said implement for selectively effecting and maintaining said predetermined lateral tilting of said tongue relative to said drawbar.

11. In combination with a tractor having a longitudinally extending drawbar supported for vertical and lateral swinging movement about vertical and horizontal axes carried by a front end support and disposed in proximate longitudinal relation thereto, said drawbar presenting a rear portion adapted for connection with the tongue of a trailing implement, an implement presenting a rigid tongue comprising forwardly projecting fixed members disposed in laterally spaced generally parallel relation, said members coacting with opposite sides of said drawbar rear portion in longitudinally overlapping relation thereto, spacers fixedly uniting longitudinally spaced portions of said members and engaging similarly spaced top and bottom surfaces of said drawbar, attaching means including longitudinally spaced elements detachably uniting said overlapping portions of said drawbar and tongue so as to provide a compound structure movable bodily as a unit both laterally and vertically relative to said front end support, said overlapping portions of said compound structure, said spacers, and said attaching means including parts spaced sufficiently for coaction in a manner affording a predetermined laterally tilting of said tongue relative to said drawbar, and additional means adjustably coacting with said implement for selectively effecting and maintaining said predetermined lateral tilting of said tongue relative to said drawbar.

12. In combination with a tractor having a longitudinally extending drawbar supported for vertical and lateral swinging movement about vertical and horizontal axes carried by a front end support and disposed in proximate longitudinal relation thereto, said drawbar presenting a rear portion adapted for connection with the tongue of a trailing implement, an implement presenting a rigid tongue having forwardly projecting fixed members disposed in laterally spaced generally parallel relation, said members coacting with opposite sides of said drawbar rear portion in longitudinally overlapping relation thereto, spacers fixedly uniting longitudinally spaced portions of said members with the rearmost one of said spacers presenting vertically spaced walls forming a forwardly opening compartment adapted to slidably receive the rearmost end of said drawbar, attaching means including longitudinally spaced elements detachably uniting said overlapping portions of said drawbar and tongue so as to provide a compound structure movable bodily as a unit both laterally and vertically relative to said front end support, said overlapping portions of said compound structure, said spacers, and said attaching means including parts spaced sufficiently for coaction in a manner affording a predetermined lateral tilting of said tongue relative to said drawbar, and additional means adjustably coacting with said implement for selectively effecting and maintaining said predetermined lateral tilting relative to said drawbar.

13. In combination, an implement presenting a rigid tongue projecting forwardly therefrom, an elongated rigid drawbar disposed in extension forming relation to said tongue and presenting a front portion adapted for connection with a propelling vehicle, said tongue comprising a pair of generally parallel fixed members disposed on opposite sides of a rear portion of said drawbar in longitudinally overlapping relation thereto, said members presenting rear portions similarly offset vertically relative to said rear portion of said drawbar, and attaching means including a spacer carried by said offset portions of said members and supporting said rear portion of said drawbar, said attaching means also including elements detachably uniting longitudinally spaced overlapping portions of said drawbar and tongue in vertically fixed relation so as to provide a compound structure movable bodily as a unit.

14. In combination, an implement presenting a rigid tongue projecting forwardly therefrom, an elongated rigid drawbar disposed in extension forming relation to said tongue and presenting a front portion adapted for connection with a propelling vehicle, said tongue comprising a pair of generally parallel fixed members disposed on opposite sides of a rear portion of said drawbar in longitudinally overlapping relation thereto, said members presenting front portions similarly offset to extend vertically above portions of said opposite sides of said drawbar immediately adjacent said front portions of said members, and attaching means detachably uniting said overlapping portions of said drawbar and tongue so as to provide a compound structure movable bodily as a unit, said attaching means including an element carried by said front portions of said members in releasable overlapping relation to a top side of said drawbar.

15. In combination, an implement presenting a rigid tongue projecting forwardly therefrom, an elongated rigid drawbar disposed in extension forming relation to said tongue and presenting a front portion adapted for connection with a propelling vehicle, said tongue comprising a pair of forwardly projecting fixed members disposed in laterally spaced generally parallel relation, said members being disposed on opposite sides of said drawbar rear portion in longitudinally overlapping relation thereto, spacers fixedly uniting longitudinally spaced portions of said members with the rearmost one of said spacers presenting vertically spaced walls forming a forwardly opening compartment adapted to slidably receive the rearmost end of said drawbar, and attaching means including elements detachably uniting said overlapping portions of said drawbar and said members so as to provide a compound structure swingable bodily as a unit.

16. In combination, an implement presenting a rigid tongue projecting forwardly therefrom, an elongated rigid drawbar disposed in extension forming relation to said tongue and presenting a front portion adapted for connection with a propelling vehicle, said tongue comprising a pair of forwardly projecting fixed members disposed in laterally spaced generally parallel relation, said members being disposed on opposite sides of said drawbar rear portion in longitudinally overlapping relation thereto, spacers fixedly uniting longitudinally spaced portions of said members with the rearmost one of said spacers presenting vertically spaced walls forming a forwardly opening compartment adapted to slidably receive the rearmost end of said drawbar, and attaching means detachably uniting said overlapping portions of said drawbar and members so as to provide a compound drawbar and tongue structure swingable bodily as a unit, said attaching means including an opening in the rear of said drawbar, aligned openings in said vertically spaced walls, and a vertically retractable element inserted through said openings.

17. In combination, an implement presenting a rigid tongue projecting forwardly therefrom, an elongated rigid drawbar disposed in extension forming relation to said tongue and presenting a front portion adapted for connection with a propelling vehicle, said tongue having a pair of forwardly projecting fixed members disposed in laterally spaced generally parallel relation, said members being disposed on laterally opposite sides of said drawbar rear portion in longitudinally overlapping relation thereto with the foremost end of said members extending somewhat above a top surface portion of said drawbar immediately adjacent said foremost end of said members, spacers fixedly uniting longitudinally spaced portions of said members, and attaching means detachably uniting said overlapping portions of said drawbar and members, said attaching means including an element carried by said foremost end of said members for retractable coaction with the top side of said drawbar so as to provide a compound structure swingable bodily as a unit.

18. In combination, an implement presenting a rigid tongue projecting forwardly therefrom, an elongated rigid drawbar disposed in extension forming relation to said tongue and presenting a front portion adapted for connection with a propelling vehicle, said tongue having a pair of forwardly projecting fixed members disposed in laterally spaced generally parallel relation, said members being disposed on laterally opposite sides of said drawbar rear portion in longitudinally overlapping relation thereto, with the foremost end of said members extending somewhat above the top surface of said drawbar, spacers fixedly uniting longitudinally spaced portions of said members with the rearmost one of said spacers presenting vertically spaced walls forming a forwardly opening compartment adapted to slidably receive the rearmost end of said drawbar, and attaching means detachably uniting said overlapping portions of said drawbar and members, said attaching means including an element carried by said foremost end of said members for retractable coaction with the underside of said drawbar so as to provide a compound structure swingable bodily as a unit.

19. In combination, an implement presenting a rigid tongue projecting forwardly therefrom, an elongated rigid drawbar disposed in extension forming relation to said tongue and presenting a front portion adapted for connection with a propelling vehicle, said tongue having a pair of forwardly projecting fixed members disposed in laterally spaced generally parallel relation, said members being disposed on laterally opposite sides of said drawbar rear portion in longitudinally overlapping relation thereto with the foremost end of said members extending somewhat above the top surface of said drawbar, spacers fixedly uniting longitudinally spaced portions of said members with the rearmost one of said spacers presenting vertically spaced walls forming a forwardly opening compartment adapted to slidably receive the rearmost end of said drawbar, and attaching means detachably uniting said overlapped portions of said drawbar and members so as to provide a compound structure swingable bodily as a unit, said attaching means including first and second retractable elements carried, respectively, by said foremost end of said members and by the rearmost one of said spacers.

20. In a trailing implement of the type adapted for detachable connection with a tractor carried drawbar, a forwardly projecting tongue structure comprising a pair of flat bar members, longitudinally separated spacer means fixedly uniting said members in laterally spaced parallel relation, said longitudinally separated spacer means presenting portions vertically offset sufficiently for engagement with longitudinally spaced top and bottom surfaces of a drawbar disposed therebetween, and a drawbar attaching means including first and second retractable elements carried, respectively, by a front portion of said members and by the rearmost one of said spacer means.

21. In a trailing implement of the type adapted for detachable connection with a tractor carried drawbar, a forwardly projecting tongue structure comprising a pair of flat bar members, longitudinally separated front and rear spacer means fixedly uniting said members in laterally spaced parallel relation, said rear spacer means presenting vertically spaced walls forming a forwardly opening compartment, said front spacer means being vertically offset from said rear means sufficiently to engage the underside of a drawbar having its rear end disposed in said compartment, and drawbar attaching means including first and second retractable elements carried, respectively, by a front portion of said members and by the rearmost one of said spacer means.

References Cited in the file of this patent

UNITED STATES PATENTS

| Number | Name | Date |
|---|---|---|
| 316,045 | Landis | Apr. 21, 1885 |
| 1,807,731 | Ehricke | June 2, 1931 |
| 2,030,567 | Bowen | Feb. 11, 1936 |
| 2,065,015 | Nielsen | Dec. 22, 1936 |
| 2,354,250 | Evans | July 25, 1944 |
| 2,386,378 | Wippel | Oct. 9, 1945 |